United States Patent [19]
Hanai et al.

[11] Patent Number: 5,104,189
[45] Date of Patent: Apr. 14, 1992

[54] RECLINING SEAT FOR MOTOR VEHICLE

[75] Inventors: Toshimichi Hanai, Yokosuka; Genjiro Takagi, Tokyo, both of Japan

[73] Assignees: Nissan Motor Co., Ltd.; Tachi-S Co., Ltd., both of Tokyo, Japan

[21] Appl. No.: 610,713

[22] Filed: Nov. 8, 1990

Related U.S. Application Data

[63] Continuation of Ser. No. 242,432, Sep. 8, 1988, abandoned.

[30] Foreign Application Priority Data

Sep. 21, 1987 [JP] Japan ............... 62-144153[U]

[51] Int. Cl.⁵ .................................... A47C 7/46
[52] U.S. Cl. ......................... 297/284 R; 297/61; 297/355
[58] Field of Search ............... 297/61, 284, 355

[56] References Cited

U.S. PATENT DOCUMENTS

| | | | |
|---|---|---|---|
| 3,540,777 | 11/1970 | Beaumont | 297/284 |
| 3,567,280 | 3/1971 | Bradshaw | 297/318 |
| 3,929,374 | 12/1975 | Hogan et al. | 297/61 |
| 3,938,858 | 2/1976 | Drakert et al. | 297/284 |
| 4,040,661 | 8/1977 | Hogan et al. | 297/61 |
| 4,159,847 | 7/1979 | Arai | 297/284 |
| 4,386,803 | 6/1983 | Gilderbloom | 297/61 |
| 4,469,374 | 9/1984 | Kashihara et al. | 297/284 |
| 4,531,779 | 7/1985 | Hashimoto | 297/284 |

FOREIGN PATENT DOCUMENTS 57-11580  6/1982  Japan .

*Primary Examiner*—Peter R. Brown
*Attorney, Agent, or Firm*—Pennie & Edmonds

[57] ABSTRACT

Disclosed herin is a reclining seat which is suited for a rear seat of a passenger motor vehicle. The reclining seat comprises a seat cushion; a seatback arranged behind the seat cushion, the seatback including an upper back part and a lower back part which are foldable relative to each other; a reclining mechanism incorporated with the lower back part of the seatback to incline the same to a certain reclined position together with the upper back part; and a seatback flexing mechanism including pivotally connected links, the links being incorporated with the reclining mechanism, the lower back part and the lower back part in such a manner that when, due to operation of the reclining mechanism, the lower back part is inclined to the certain reclined position, the upper back part is pivoted in such a direction as to cause an upper end portion thereof to move forward relative to aid lower back part, and at the same time, a given portion of the lower back part is pivoted in such a direction as to cause a lower end portion thereof to move rearward relative to the remained portion of the lower back part.

7 Claims, 7 Drawing Sheets

RECLINING SEAT FOR MOTOR VEHICLE

This is a continuation of application Ser. No. 07/242,432, filed Sept. 8, 1988 now abandoned.

BACKGROUND OF THE INVENTION

1. Field of the Invention

The present invention relates in general to seats of a reclining type, and more particularly to the reclining seats which are suited for a rear seat of a passenger motor vehicle.

2. Description of the Prior Art

In order to clarify the task of the present invention, one conventional reclining seat will be outlined with reference to FIG. 4 of the accompanying drawings, which is disclosed in Japanese Utility Model Second Provisional Publication No. 57-11580.

As is seen from FIG. 4, the reclining seat disclosed by the publication has not only a seatback tilting function wherein the seatback is tiltable but also a seatback flexing function wherein the seatback can flex.

The reclining seat comprises a seat cushion 15 which is mounted through a seat slide device 20 on a vehicle floor 9. The seat cushion 15 carries at its rear part a seatback 11 which comprises an upper back part 21 and a lower back part 22. The upper and lower back parts 21 and 22 are pivotally connected through an upper hinge device 23, and the lower back part 22 and the seat cushion 15 are pivotally connected through a lower hinge device 24. The upper back part 21 has an elongate plate 25 secured to one side thereof. The plate 25 is formed with an elongate opening 26 with which a guide pin 29 held by a bracket 28 is slidably engaged. The bracket 28 is secured to a body panel 27 of an associated vehicle.

When, due to operation of the seat slide device 20, the seat cushion 15 is moved forward to a front position illustrated by a phantom line in the drawing, the lower hinge device 24 is moved forward pulling the lower portion of the lower back part 22 in the same direction. During this movement, the upper back part 21 is forced to move downward along the body panel 27 due to the slidable engagement between the elongate opening 26 and the guide pin 29. Thus, finally, the seatback 11 assumes its reclined position with a shallow angle defined between the upper and lower back parts 21 and 22, as is illustrated by a phantom line.

However, due to its inherency in construction, the conventional reclining seat has the following drawback.

That is, in order to obtain a reclining condition of the seat, the seat cushion 15 is forced to move forward to the front position in such a manner as mentioned hereinabove. However, as is easily understood from the drawing, the forward movement of the seat cushion 15 narrows the seat occupant foot space "S" defined before the seat. This mean that the reclining seats of this type are not suited for a seat, such as a rear seat of a passenger motor vehicle, which is to be mounted in a limited rear space of the vehicle cabin.

SUMMARY OF THE INVENTION

It is therefore an object of the present invention to provide a reclining seat which is free of the above-mentioned drawback.

According to the present invention, there is provided a reclining seat which comprises a seat cushion; a seatback arranged behind the seat cushion, the seatback including an upper back part and a lower back part which are foldable relative to each other; a reclining mechanism incorporated with the lower back part of the seatback to incline the same to a certain reclined position together with the upper back part; and a seatback flexing mechanism including pivotally connected links, the links being incorporated with the reclining mechanism, the upper back part and the lower back part in such a manner that when, due to operation of the reclining mechanism, the lower back part is inclined to the certain reclined position, the upper back part is pivoted in such a direction as to cause an upper end portion thereof to move forward relative to the lower back part, and at the same time, a given portion of the lower back part is pivoted in such a direction as to cause a lower end portion thereof to move rearward relative to the remained portion of the lower back part.

DETAILED DESCRIPTION OF THE INVENTION

In the following, the present invention will be described in detail with reference to FIGS. 1 to 3.

Figure 1:
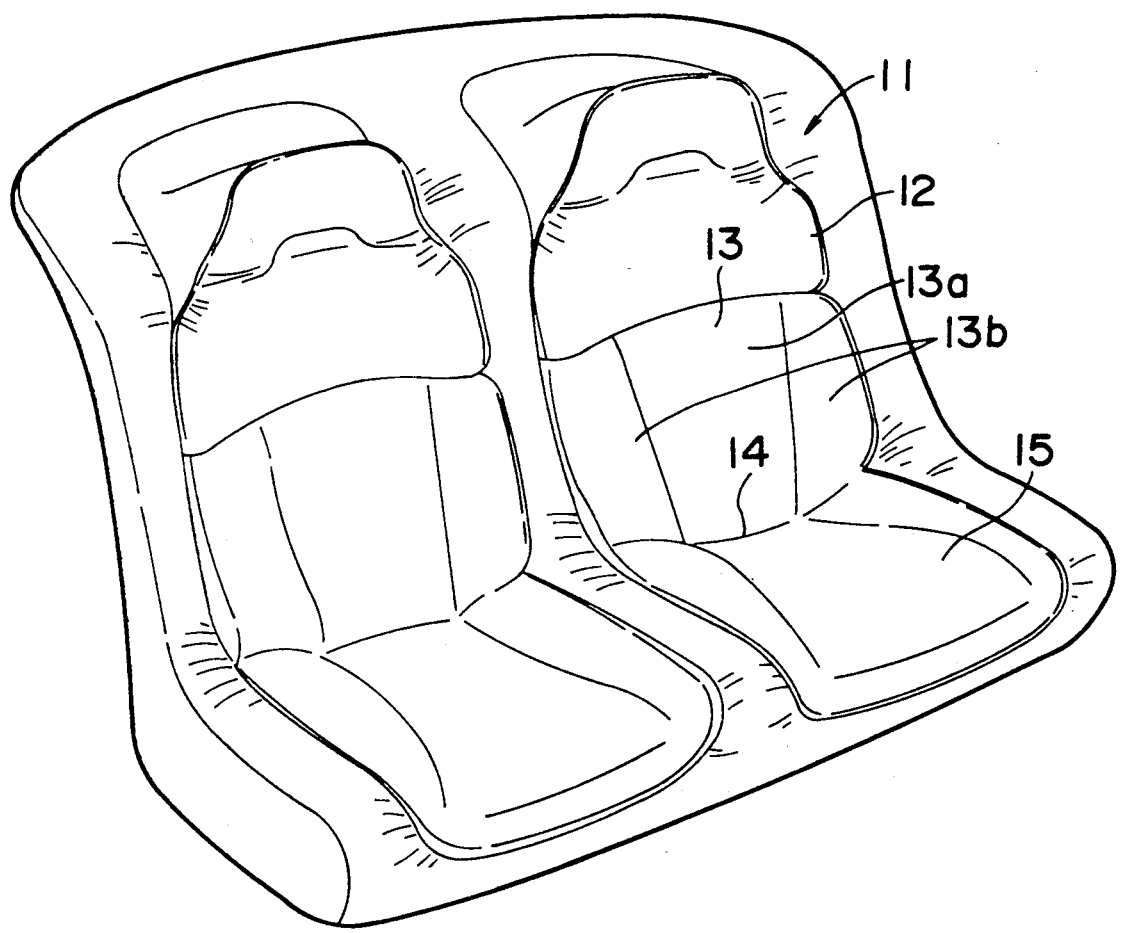
FIG. 1 is a perspective view of a reclining seat according to the present invention.

FIG. 1 shows a double seat which is used as a rear seat of a passenger motor vehicle. The double seat comprises two abreast arranged reclining seats each embodying the present invention.

Each reclining seat comprises generally a seat cushion 15 and a seatback 11. Numerals 12 and 13 denote upper and lower back parts of the seatback 11 respectively. Numeral 13a denotes a center portion of the lower back part 13, while, numerals 13b and 13b denote side portions of the same. Numeral 14 denotes a lower edge of the lower back part 13. For the reasons which will be described hereinafter, the cushion pad (not shown) of the lower back part 13 is separated into three pieces for the center portion 13a and the other two side portions 13b and 13b respectively.

Figure 2:
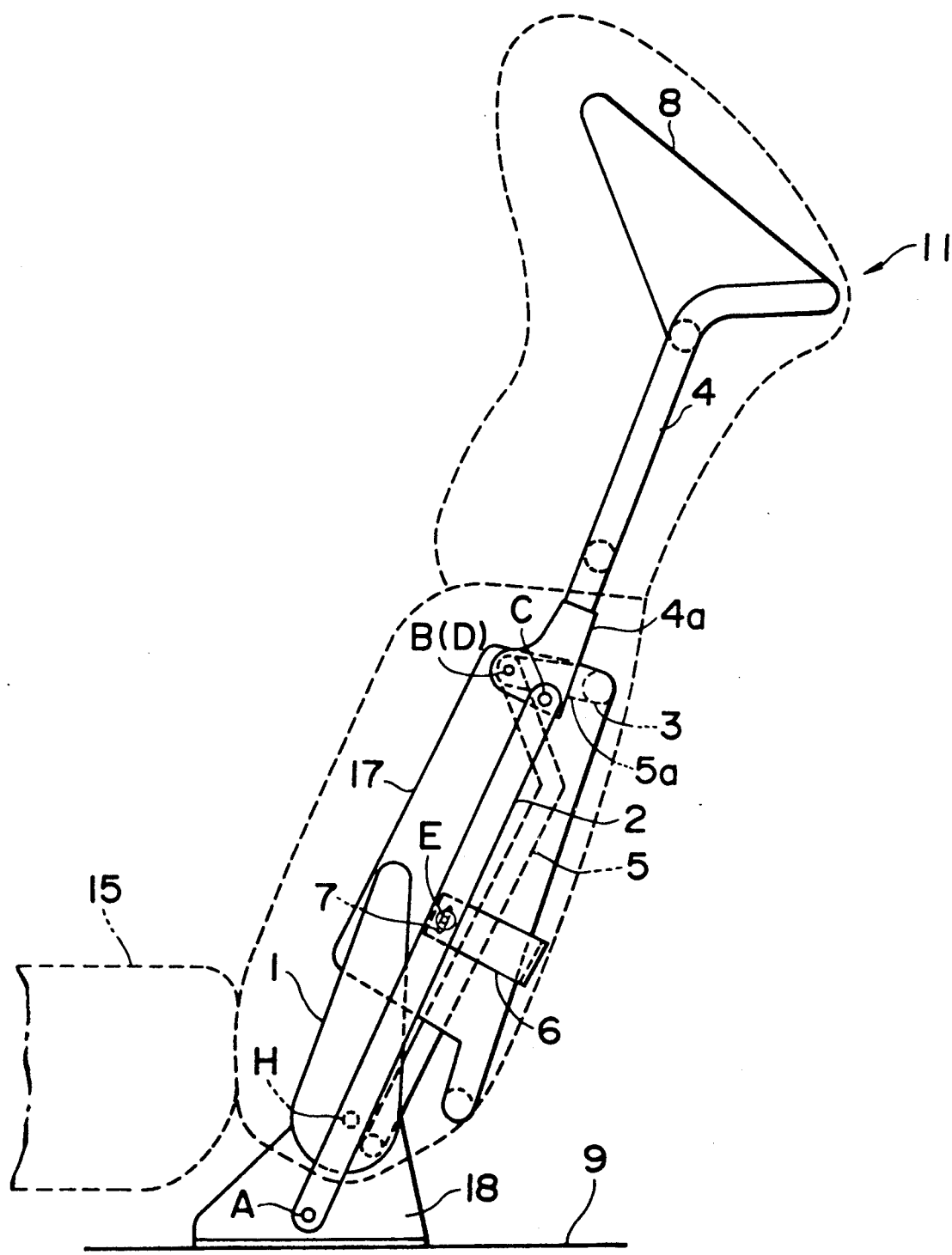
FIG. 2 is a side view of a frame structure of a seatback of the reclining seat.
Figure 3:
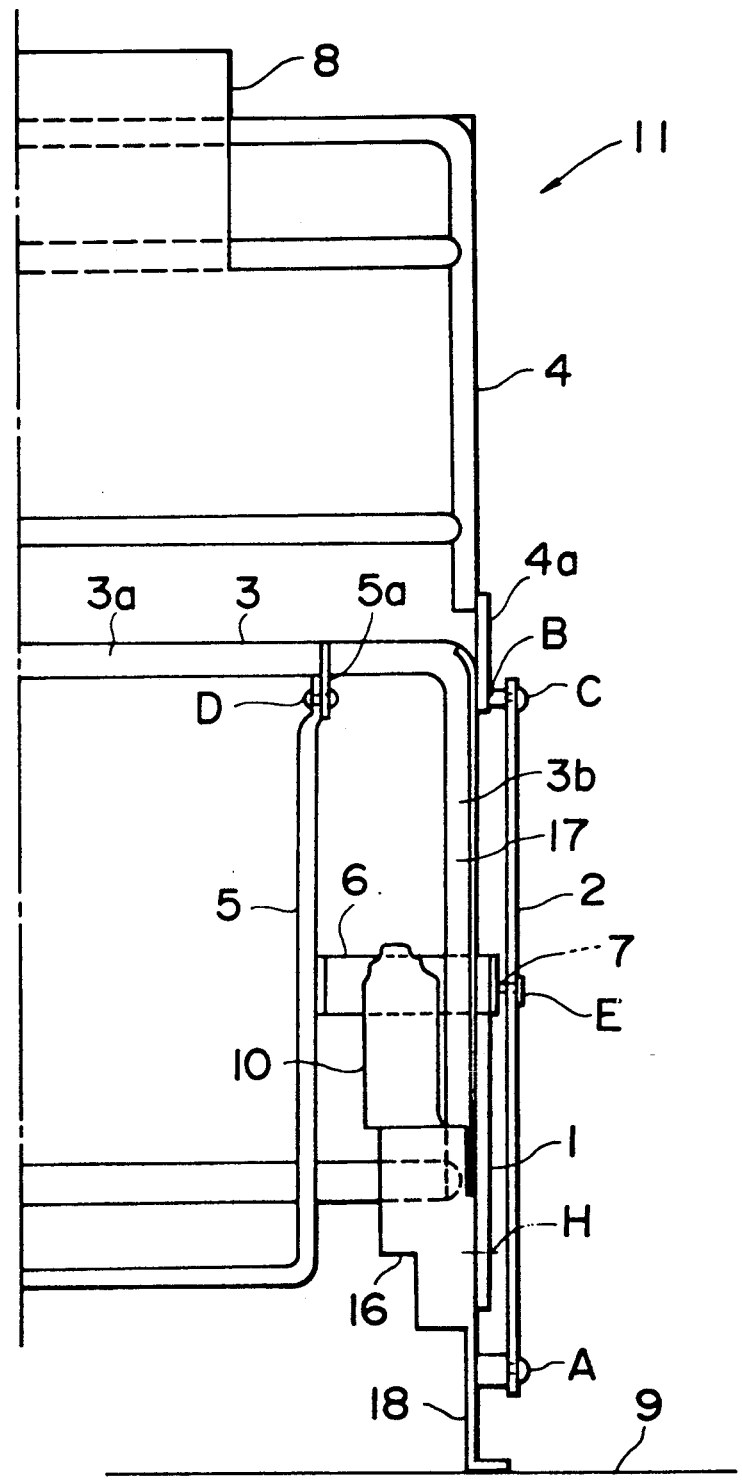
FIG. 3 is a front, but half, view of the frame structure of the seatback.
Figure 4:
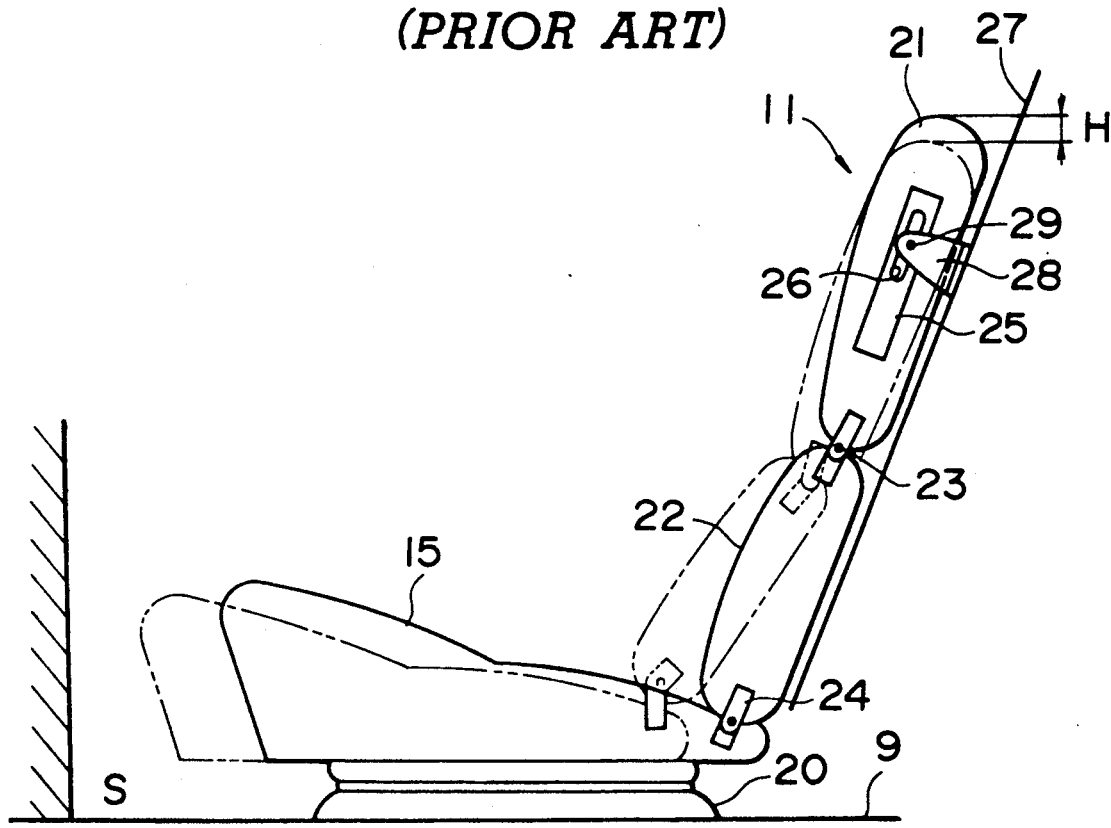
FIG. 4 is a side view of a conventional reclining seat.
Figure 5:
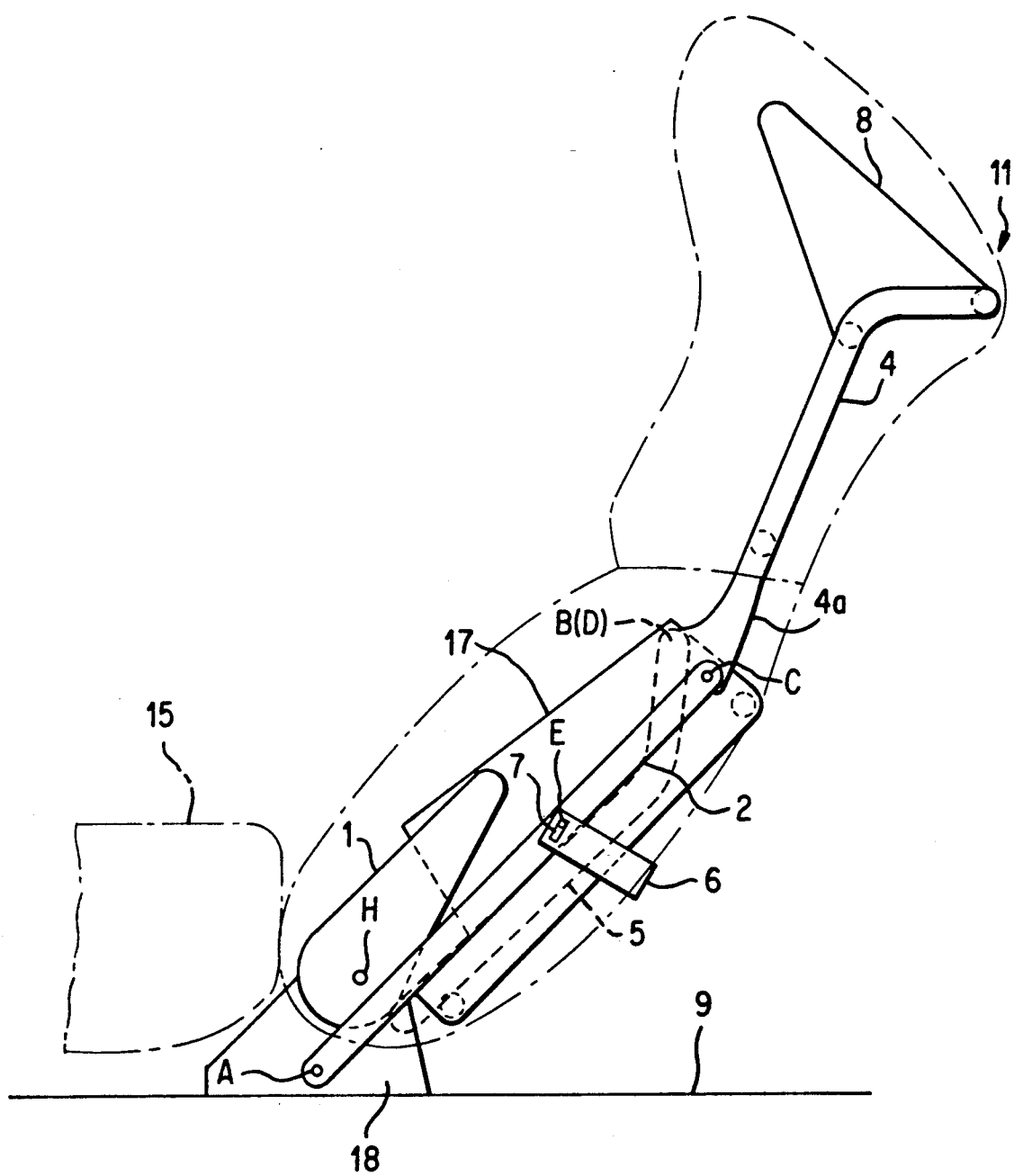
FIG. 5 is a side view of a frame structure of a reclining seat according to the present invention in a reclined position.

Referring to FIGS. 2 and 3, there is shown the interior construction of the seatback 11, which is pivotally mounted on paired mounting brackets 18 (only one is shown) secured to a vehicle floor 9 at a position behind the seat cushion 15 (see FIG. 2). As is shown in FIG. 3, an electric motor 10 and a speed reduction gear 16 are mounted to one of the mounting brackets 18, which constitute a drive means for a reclining mechanism as will be described hereinafter.

The interior construction of the seatback 11 comprises a generally rectangular lower frame 3 which has at side portions 3b thereof respective side plates 17 secured thereto and projected forward (see FIG. 2). The side plates 17 are secured to respective pivoting arms 1 which are pivotally connected through pivot pins "H" to the mounting brackets 18.

The interior construction of the seatback 11 further comprises a generally rectangular upper frame 4. As is seen from FIG. 2, the upper frame 4 has side lower portions pivotally connected through generally L-shaped levers 4a to upper ends of the side plates 17. That is, each lever 4a has one arm portion secured to the side lower portion of the upper frame 4 and the other arm portion pivotally connected through a pivot pin "B" to the side plate 17.

Thus, the entire seatback 11 can pivot about a common axis of the pivot pins "H" relative to the mounting brackets 18, that is, relative to the vehicle floor 9, and the upper frame 4 can pivot about a common axis of the pivot pins "B" relative to side plates 17, that is, relative to the lower frame 3. Although not shown in the drawings, the lower frame 3 is covered with the above-mentioned three separated cushion pad pieces in an aftermentioned manner, and the upper frame 4 is covered with another cushion pad in a conventional manner. Designated by numeral 8 is a frame for forming a head rest portion of the seatback 11.

As is seen from FIG. 3, one of the pivoting arms 1 is operatively connected to the speed reduction gear 16, so that energization of the electric motor 10 causes a pivotal movement of the pivoting arm 1, and thus, a pivotal movement of the entire seatback 11 about the common axis of the pivot pins "H" relative to the vehicle floor 9.

According to the present invention, there is further provided a seatback flexing mechanism.

The seatback flexing mechanism comprises a U-shaped frame 5 which, as is seen from FIG. 3, has two leg portions each having a rearwardly bent portion and pivotally connected at the upper end to an upper part 3a of the lower frame 3 through a supporting bracket 5a. That is, as is seen from FIG. 2, each supporting bracket 5a has one end secured to the upper part 3a of the lower frame 3 and the other end pivotally connected through a pivot pin "D" to the corresponding leg portion of the U-shaped frame 5. Thus, it will be appreciated that the U-shaped frame 5 is pivotal about a common axis of the pivot pins "D" relative to the lower frame 3. The pivoting U-shaped frame 5 is covered with one of the aforementioned three cushion pad pieces to pivot therewith, while, the side portions 3b of the lower frame 3 are covered with the other two cushion pad pieces respectively. Thus, the cushion pad piece held by the U-shaped frame 5 is pivotally movable relative to the other two cushion pad pieces held by the side portions 3b of the lower frame 3.

Each side portion of the U-shaped frame 5 has a generally U-shaped bracket 6 secured thereto. The U-shaped bracket 6 includes a middle portion straddling a rear end of the side plate 17 (see FIG. 2) and a terminal end (no numeral) placed over the outer surface of the side plate 17. The terminal end of the bracket 6 is formed with a slot 7 for the purpose which will be described in the following.

As will be well understood from FIG. 2, an elongate link 2 is provided at each side of the lower frame 3. That is, the link 2 has a lower end pivotally connected through a pivot pin "A" to the correponding mounting bracket 18 and an upper end pivotally connected through a pivot pin "C" to a center part (vbiz., jointed part of the two arm portions) of the L-shaped level 4a. It is to be noted that the pivot pin "A" is located below the pivot pin "H" of the afore-mentioned pivoting arm 1. The link 2 is equipped at its middle portion with a pin E which is projected into the slot 7 of the above-mentioned U-shaped bracket 6.

When, in operation, the electric motor 10 is energized to run in a given direction, the pivoting arm 1 is pivoted clockwisely in FIG. 2 about the pivot pin "H". With this movement, both the rectangular lower frame 3 and the rectangular upper frame 4 are moved backwardly about the common axis of the pivot pins "H".

During this backward motion, as described below, two simultaneous operations are carried out; the forward rotation of upper back part 12 about pivot pin "B" and the rearward rotation of the lower back part 13a about pivot pin "D".

Figure 6:
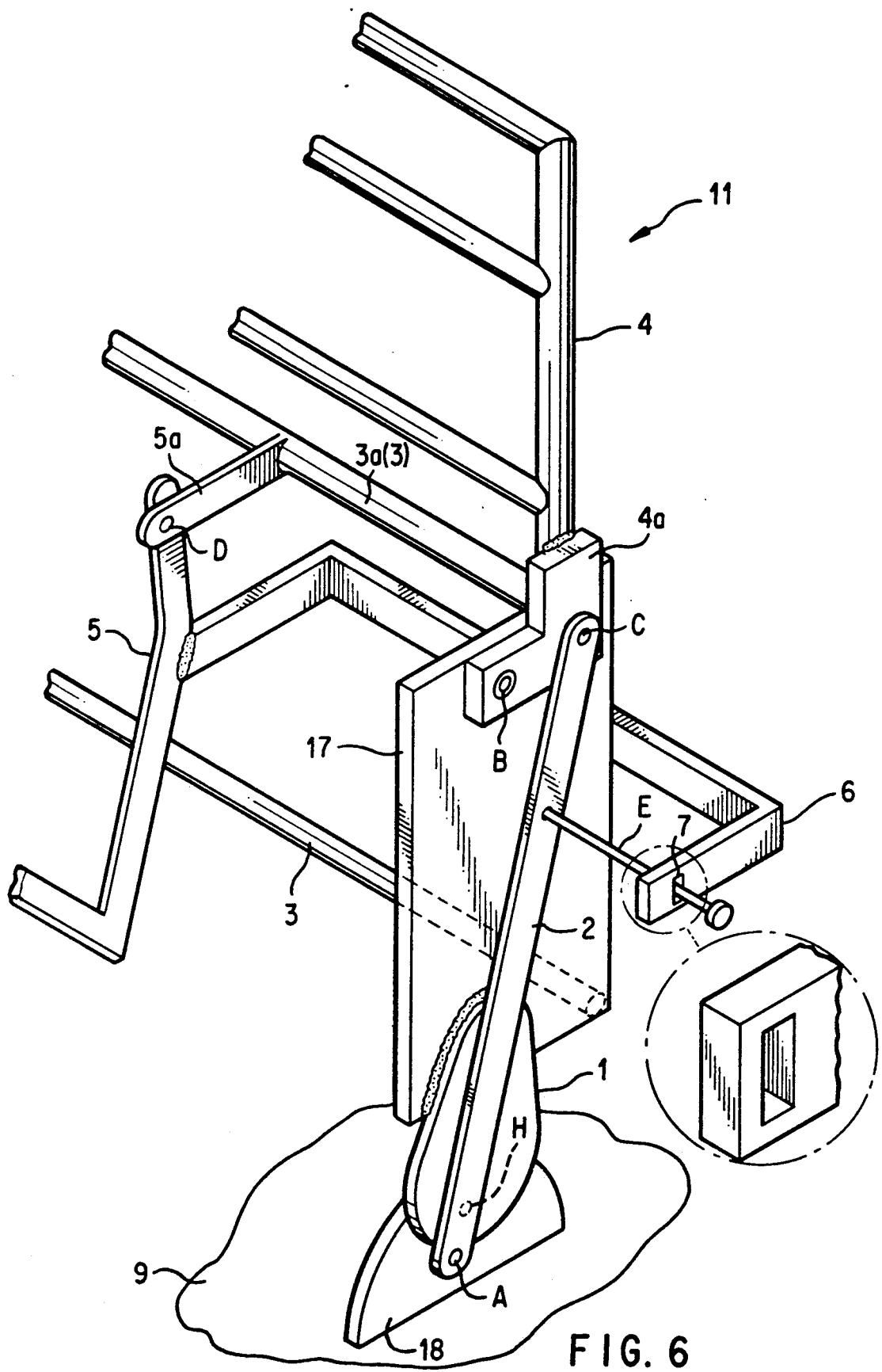
FIG. 6 is a rotational perspective view of a seat back frame structure of the present invention.

The forward rotation of the upper seatback 12 is effected as follows:

Referring to FIG. 6, a first torque link means, for pivoting the upper frame 4 of the upper back part 12 about pivot pin "B" comprises, for example, elongate link 2, the L-shaped lever 4a, connected at respective pivot points A and C.

Figure 7:
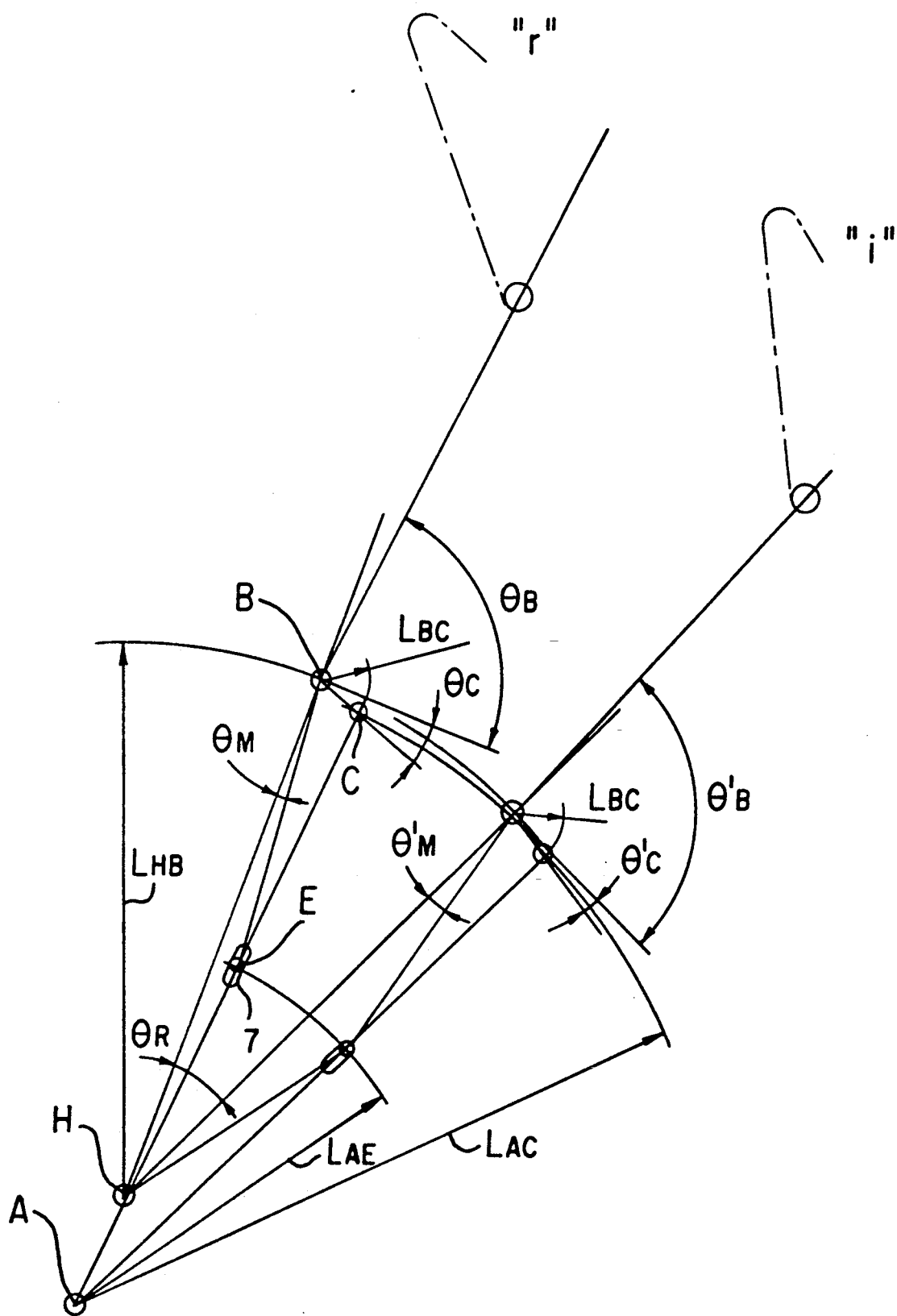
FIG. 7 shows the geometrical relation between elements of the present seat back frame structure upon assuming an upright and reclined position.

As seen from FIG. 6, the backward pivoting of the pivoting arm 1, which is fixedly attached to the plate member 17 and lower frame 3, causes the elongate link 2 to push up the L-shaped level 4a. The pushing action is due to the plate member 17 and the elongate link 2 pivoting about different pivot points, which are "A" and "H" respectively. The upper frame 4 of the upper back part 12 is thus pivoted forwardly about the pivot pin "B". The geometry of this operation is shown in FIG. 7, with Lhb indicating the radial distance along the side plate 17 from pivot point "H" to pivot point "B", Lac indicating the radial distance along the elongate link 2 between pivot point A and pivot point C, and Lae indicating the radial distance along the elongate link between pivot point A and the pin E.

In particular, when the upper seatback 11 is in its upright position "r" the seatback angle is "Oc", measured with respect to the tangent to the arc motion of pivot point "B" of elongate link 2 and the line connected between pivot points "B" and "C". When the upper seatback 11 assumes a reclined position "i" the pushing action of the elongate link 2 rotates the lever 4a and forces a seatback angle of Oc'. The upper seatback 12 angle can also be defined with respect to the seatback 12 and the above defined tangent line, shown as Ob and Ob' respectively.

Furthermore, during the inclining movement of the seatback 11, the pin "E" of the elongate link 2 slides upwardly in the slot 7 of the U-shaped bracket 6 and abuts against an upper end of the slot 7.

A second torque link means for moving frame 5 with respect to plate 17 consists, for example, of the generally U-shaped bracket 6, slot 7, and pin E.

As the pin "E" slides upwardly in slot 7 the pin presses against the rear side of the slot, which is shown in FIG. 6. This pressing force pushes the bracket 6 rearward causing a counterclockwise (but small) rotation of the U-shaped frame 5 about the pivot pin "D". The operation as shown in FIG. 7 moves the frame 5, with respect to plate 17, from its initial angle Om to a position angle Om'.

As will be understood from the above description, when the seatback 11 (see FIG. 1) is inclined rearward to a suitable reclined position, the upper back part 12 thereof pivots forward about the common axis of the pivot pins "B" relative to the lower back part 13, and at the same time, the center portion 13a of the lower back part 13 pivots rearward about the common axis of the pivot pins "D" relative to the remained side portions 13b of the same 13.

That is, in accordance with the present invention, the inclination of the seatback 11 to its reclined position is carried out without movement of the seat cushion 15.

Thus, the reclining seat of the present invention is suited for a rear seat of a passenger motor vehicle. Furthermore, the rearward movement of the center portion 13a of the lower back part 13, which is effected upon reclining movement of the seatback 11, permits a seat occupant to sit deep in the seat.

What is claimed is:

1. A reclining seat on a floor, comprising:
    a seat cushion;
    a seatback arranged behind said seat cushion, said seatback including an upper back part and a lower back part;
    a reclining mechanism incorporated with said seatback to incline the same about a first axis of rotation to a certain reclined position relative to said seat cushion; and
    a seatback flexing mechanism including:
    a generally U-shaped frame, supporting a lower back central cushion, having two upwardly extending leg portions pivotally connected, about a second axis of rotation, to an upper portion of a lower frame, which is pivotally connected about said first axis of rotation to said floor, and which supports a side cushion of said lower back part;
    an L-shaped lever having one arm portion secured to a lower portion of said upper back part and the other arm portion pivotally connected, about a third axis of rotation, to an upper portion of said lower back portion;
    an elongate link having a lower end pivotally connected to said floor and an upper end pivotally connected to a joining portion of said two arm portions of said L-shaped lever;
    a bracket secured to said generally U-shaped frame to move therewith;
    means defining a slot in one of said bracket and said elongated link; and
    a pin secured to the other of said bracket and said elongate link and loosely projected into said slot,
    whereby when said seatback is inclined rearwards said elongate link rotates said L-shaped bracket to forwardly rotate said upper back part relative to said lower back part.

2. A reclining seat as claimed in claim 1, in which said lower pivot of said elongate link is placed below said first axis provided by said reclining mechanism.

3. A reclining seat as claimed in claim 1, in which said bracket is so shaped and sized as to straddle said plate member.

4. A reclining seat as claimed in claim 1, in which the cushion pad covering said lower back part is separated into three pieces, one of said pieces covering only said U-shaped pivoting frame, while the other pieces covering side portions of the rectangular frame of said lower back part.

5. A reclining seat as claimed in claim 1, in which said leg portions of said U-shaped frame have rearwardly bent portions respectively.

6. A reclining seat as claimed in claim 1, in which said reclining mechanism comprises an electric motor and a speed reduction gear which are so arranged as to induce the inclining movement of the lower back part frame upon energization of said electric motor.

7. A reclining seat for an automobile, comprising the following:
    a peripheral lower seat back section pivotally attached at its lower portion by a first pivotal mounting means to the floor of said vehicle, said mounting means having a first pivot axis;
    a rotating means, operatively connected to said peripheral lower seat back section, which selectably rotates said peripheral lower seat back section about said first pivot axis;
    an upper seat back section pivotally attached at its lower portion by a second pivotal mounting means to an upper portion of said peripheral lower seat back section, said second mounting means having a second pivot axis;
    a first torque link means operatively connected to the floor of said vehicle and said upper seat back section such that when said peripheral lower seat back section is pivoted rearward about said first pivot axis the first torque link means transmits a force causing said upper seat back section to pivot forward about said second pivot axis;
    a central lower seat back section, pivotally attached at its upper portion to an upper portion of said peripheral lower seat back section by a third pivotal mounting means, said third pivotal mounting means having a third pivot axis which is substantially parallel with and proximal to said second pivot axis; and
    a second torque link means operatively connected to said first torque link means and said central lower seat back section such that when said peripheral lower seat back section is pivoted rearward about said first pivot axis the second torque link means transmits a force which causes a rearward rotation of said central lower seat back section about said third pivot axis.

* * * * *